unitedstates Patent

United States Patent
Thelin

(10) Patent No.: US 6,854,022 B1
(45) Date of Patent: Feb. 8, 2005

(54) DISK DRIVE USING ROTATIONAL POSITION OPTIMIZATION ALGORITHM TO FACILITATE WRITE VERIFY OPERATIONS

(75) Inventor: Gregory B. Thelin, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 533 days.

(21) Appl. No.: 10/080,780

(22) Filed: Feb. 22, 2002

(51) Int. Cl.[7] ................................................. G06F 3/00
(52) U.S. Cl. ................... 710/5; 710/6; 710/39; 710/74; 711/112; 711/113; 369/53.1; 369/53.41; 369/53.42
(58) Field of Search ........................... 710/5, 6, 39, 74; 711/112, 113; 369/53.1, 53.41, 53.42; 365/1

(56) References Cited

U.S. PATENT DOCUMENTS

| | | | |
|---|---|---|---|
| 5,588,007 A | 12/1996 | Ma | |
| 5,872,800 A | 2/1999 | Glover et al. | |
| 5,909,334 A | 6/1999 | Barr et al. | |
| 5,941,998 A | 8/1999 | Tillson | |
| 5,991,825 A | 11/1999 | Ng | |
| 6,078,452 A * | 6/2000 | Kittilson et al. | 360/51 |
| 6,289,484 B1 | 9/2001 | Rothberg et al. | |
| 6,445,524 B1 * | 9/2002 | Nazarian et al. | 360/49 |
| 6,452,735 B1 * | 9/2002 | Egan et al. | 360/31 |
| 6,625,094 B1 * | 9/2003 | Park et al. | 369/47.14 |
| 6,639,885 B1 * | 10/2003 | Yada et al. | 369/53.45 |

* cited by examiner

*Primary Examiner*—Jeffrey Gaffin
*Assistant Examiner*—Justin Knapp
(74) *Attorney, Agent, or Firm*—Milad G. Shara, Esq.; Howard H. Sheerin, Esq.

(57) ABSTRACT

A disk drive is disclosed wherein a write command is verified according to a rotational position optimization (RPO) algorithm rather than immediately after the write command to better optimize drive performance relative to mechanical latencies.

22 Claims, 5 Drawing Sheets

DISK DRIVE USING ROTATIONAL POSITION OPTIMIZATION ALGORITHM TO FACILITATE WRITE VERIFY OPERATIONS

BACKGROUND OF THE INVENTION

1. Field of the Invention

The present invention relates to disk drives. More particularly, the present invention relates to a disk drive using a rotational position optimization (RPO) algorithm to facilitate write verify operations.

2. Description of the Prior Art

It has been suggested to verify write operations in a disk drive by reading recently written data sectors to verify their recoverability before releasing the cache memory storing the write data. If a recently written data sector cannot be recovered, the write data stored in the cache memory is rewritten to the disk. In effect, the write verify operation detects and compensates for "bad writes" due, for example, to an abnormal fly height or other random anomaly not detected during the write operation. Due to the rotational latency needed to reread a data sector as well as the rotational latency needed to rewrite the data sector, the prior art has suggested various methods for performing the write verify operation so as to minimize the impact on performance.

U.S. Pat. No. 5,872,800 suggests to perform a write verify operation "off-line" while the disk drive is in an idle mode and not processing commands received from the host computer. In this manner, the write verify operation does not impact the performance of the disk drive while processing host commands during normal operation. However, this technique requires a significant amount of cache memory in order to cache the write data for all of the write commands received from the host while the disk drive is "on-line", as well as the read data associated with read commands received during the same "on-line" period. If the cache memory is exhausted during an "on-line" period, at least some of the write verify commands will be discarded which is undesirable. This problem is exacerbated if the "off-line" periods are short due to frequent access to the disk drive by the host computer.

U.S. Pat. No. 6,289,484 discloses a write verify technique wherein the disk drive performs an "off-line" scan of all previously written data sectors. If during the off-line scan a data sector cannot be recovered on-the-fly using the sector level redundancy, then the data sector is added to a "bad block" list. If during an "on-line" mode the disk drive attempts to write to a data sector in the bad block list, the disk drive will perform an immediate write verify operation on the data sector. In this manner, only the suspect data sectors in the bad block list are verified after a write operation in order to minimize the impact on performance. However, a bad write can occur due to a random anomaly, such as an abnormal fly height, which may not be detected during the off-line scan.

U.S. Pat. No. 5,588,007 discloses a write verify technique wherein the disk drive monitors the on-line write operations for abnormal fly height conditions. If an abnormal fly height condition is detected during a write operation, the disk drive performs an immediate write verify operation on the data sector. However, a bad write may occur due to a random anomaly other than an abnormal fly height.

There is, therefore, the need to improve the write verify operation of a disk drive by minimizing the cache memory requirements while maxi zing the probability that every undetected bad write is corrected.

SUMMARY OF THE INVENTION

The present invention may be regarded as a disk drive comprising a disk having a plurality of concentric tracks, each track comprising a plurality of data sectors, and a head actuated radially over the disk. The disk drive further comprises an input/output (I/O) queue for storing read and write commands received from a host computer, and a disk controller for executing the commands stored in the I/O queue in an order determined from a rotational positioning optimization (RPO) algorithm. The disk controller selects a write command from the I/O queue according to the RPO algorithm, seeks the head to a target track, and writes data to a target data sector. After executing the write command, the disk controller inserts a write verify command into the I/O queue. The disk controller then selects the write verify command from the I/O queue according to the RPO algorithm and executes the write verify command to verify the recoverability of the data written to the target data sector.

In one embodiment, the disk drive comprises a semiconductor memory comprising a plurality of blocks for storing write data received from the host computer and for storing read data read from the disk. The block of semiconductor memory storing the write data for the target data sector is de-allocated after the disk controller executes the write verify command. In another embodiment, the block of semiconductor memory storing the write data for the target data sector is de-allocated prior to the disk controller executing the write verify command if the amount of free blocks in the semiconductor memory is less than a predetermined threshold. In one embodiment, the I/O queue stores a plurality of write verify commands corresponding to a plurality of written data sectors, and when the number of free blocks in the semiconductor memory is less than the predetermined threshold, the disk controller uses a predetermined criteria to delete at least one of the write verify commands from the I/O queue and to de-allocate the corresponding block of semiconductor memory. In one embodiment, the predetermined criteria deletes the write verify command that optimizes the RPO algorithm with respect to the remaining commands in the I/O queue. In another embodiment, each write command comprises data to be written to one or more data sectors, and the predetermined criteria deletes the write verify command comprising the least number of data sectors to be verified compared to other write verify commands in the I/O queue.

In one embodiment, the disk controller executes the write verify command by seeking the head to the target track and reading data from the target data sector. If the read fails, the disk controller selects the write command from the I/O queue according to the RPO algorithm and executes the write command. In one embodiment if the read fails and the write data associated with the write command has been de-allocated prior to the disk controller executing the write verify command, the disk controller executes a firmware error-recovery procedure to recover the write data stored in the target data sector, stores the recovered write data in a semiconductor memory, and inserts a write command into the I/O queue for writing the write data to the target data sector. In one embodiment if a write verify fails multiple times for the same write command, the disk controller inserts a relocate command into the I/O queue for processing according to the RPO algorithm, the relocate command for relocating an errant data sector.

The present invention may also be regarded as a method of executing a write verify operation in a disk drive, the disk drive comprising a disk having a plurality of concentric tracks including a plurality of data sectors, a head actuated radially over the disk, and an input/output (I/O) queue for storing read and write commands received from a host computer. A write command is selected from the I/O queue according to a rotational positioning optimization (RPO) algorithm. After seeking the head to a target track, data is written to a target data sector. A write verify command is inserted into the I/O queue, and then selected from the I/O queue according to the RPO algorithm. The write verify command is executed to verify the recoverability of the data written to the target data sector.

DESCRIPTION OF THE PREFERRED EMBODIMENTS

Figure 1A:
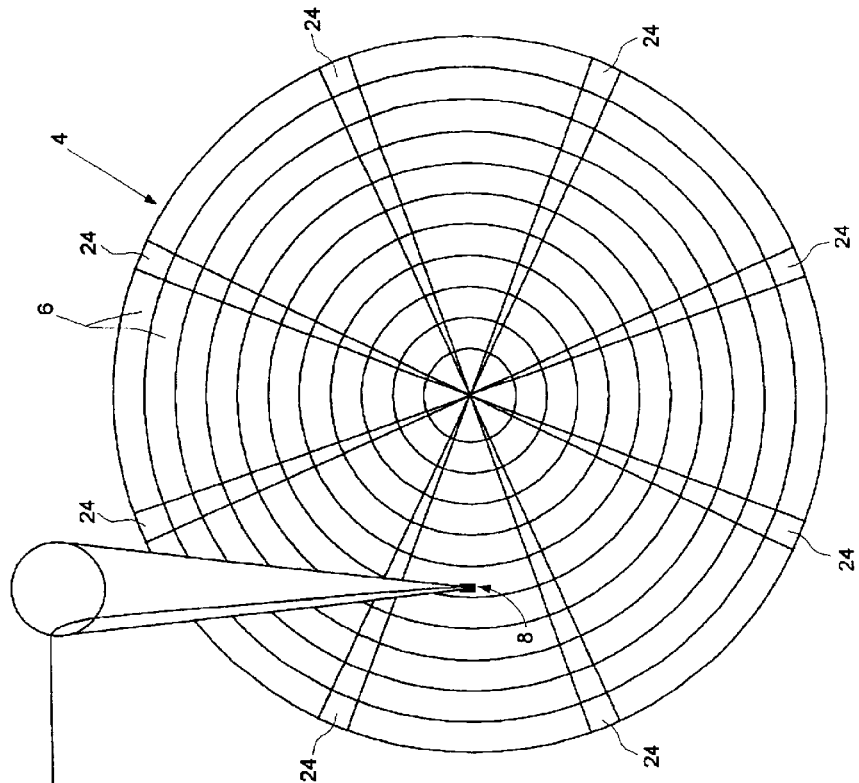
FIGS. 1A and 1B show a disk drive according to an embodiment of the present invention wherein write verify commands are executed according to a rotational positioning optimization (RPO) algorithm.
Figure 1B:
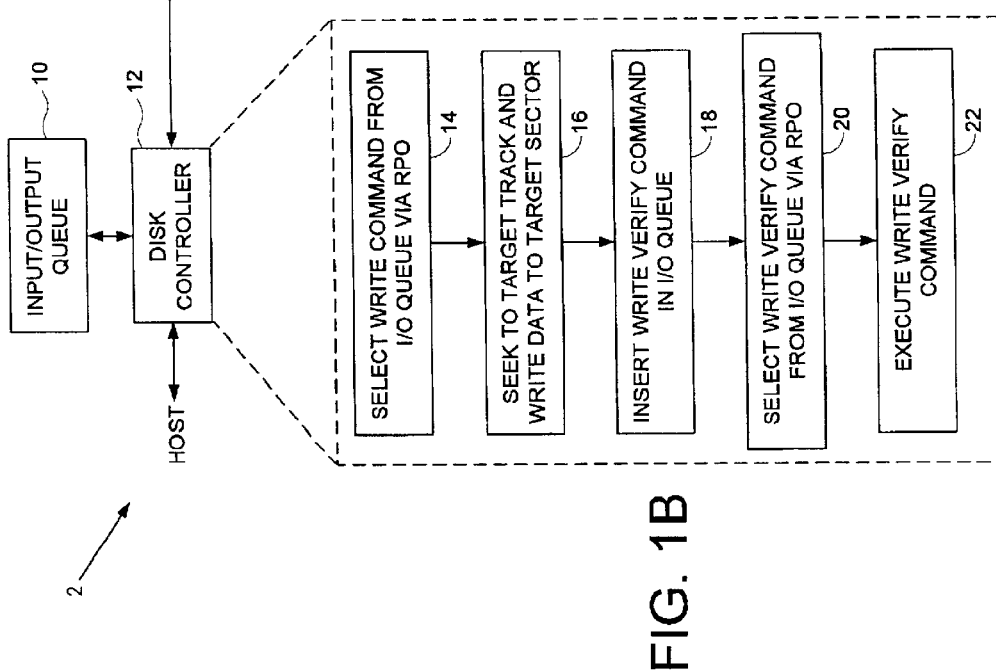

FIG. 1A shows a disk drive 2 comprising a disk 4 having a plurality of concentric tracks 6, each track comprising a plurality of data sectors, and a head 8 actuated radially over the disk 4. The disk drive 2 further comprises an input/output (I/O) queue 10 for storing read and write commands received from a host computer, and a disk controller 12 for executing the commands stored in the I/O queue 10 in an order determined from a rotational positioning optimization (RPO) algorithm. FIG. 1B is a flow diagram illustrating the steps executed by the disk controller 12 when performing a write operation. At step 14 the disk controller 12 selects a write command from the I/O queue 10 according to the RPO algorithm, and at step 16 seeks the head 8 to a target track and writes data to a target data sector. After executing the write command, at step 18 the disk controller 12 inserts a write verify command into the I/O queue 10. At step 20 the disk controller 12 then selects the write verify command from the I/O queue 10 according to the RPO algorithm and at step 22 executes the write verify command to verify the recoverability of the data written to the target data sector.

In the embodiment of FIG. 1A, the disk 4 further comprises a plurality of embedded servo sectors 24 which are processed by the disk controller 12 to servo control the radial location of the head 8. Each embedded servo sector 24 comprises coarse head positioning information (e.g., a track number) as well as fine positioning information in the form of servo bursts recorded at precise offsets from the target track's centerline.

Any suitable RPO algorithm may be employed in the present invention. In general, the RPO algorithm computes an estimated access time for each command in the I/O queue, taking into account the current radial and circumferential location of the head. The RPO algorithm selects the command having the smallest access time as the next command to execute. This enhances performance of the disk drive by maximizing efficiency relative to its mechanical latencies. The performance of the disk drive 2 in FIG. 1A is further enhanced by executing write verify commands in an optimal manner as determined from the RPO algorithm. In some cases it may be that a write verify command is the next best command to execute after a write command. However, there are cases where it is more efficient to perform at least one other command (e.g., another write command to the same or proximate track) before executing a write verify command for a previous write operation.

In one embodiment, the disk controller 12 executes the write verify command by seeking the head 8 to the target track and reading data from the target data sector. If the read fails, the disk controller 12 selects the write command from the I/O queue 10 according to the RPO algorithm and re-executes the write command. In one embodiment, a write command is deleted immediately from the I/O queue 10 after performing the write command. If the corresponding write verify command fails, the write command is re-inserted into the I/O queue 10. In an alternative embodiment, the write command is not deleted from the I/O queue 10 until the write verify command is successfully executed. In this manner it is not necessary to re-insert the write command into the I/O queue if the corresponding write verify command fails. In yet another embodiment, the original write command is modified into a write verify command after performing the write operation. If the write verify fails, the write verify command is modified back into a write command in order to re-execute the write command. If the write verify fails a number of times which exceeds a predetermined threshold, the write verify command is modified into a relocate command in order to relocate an errant data sector(s).

Figure 2:
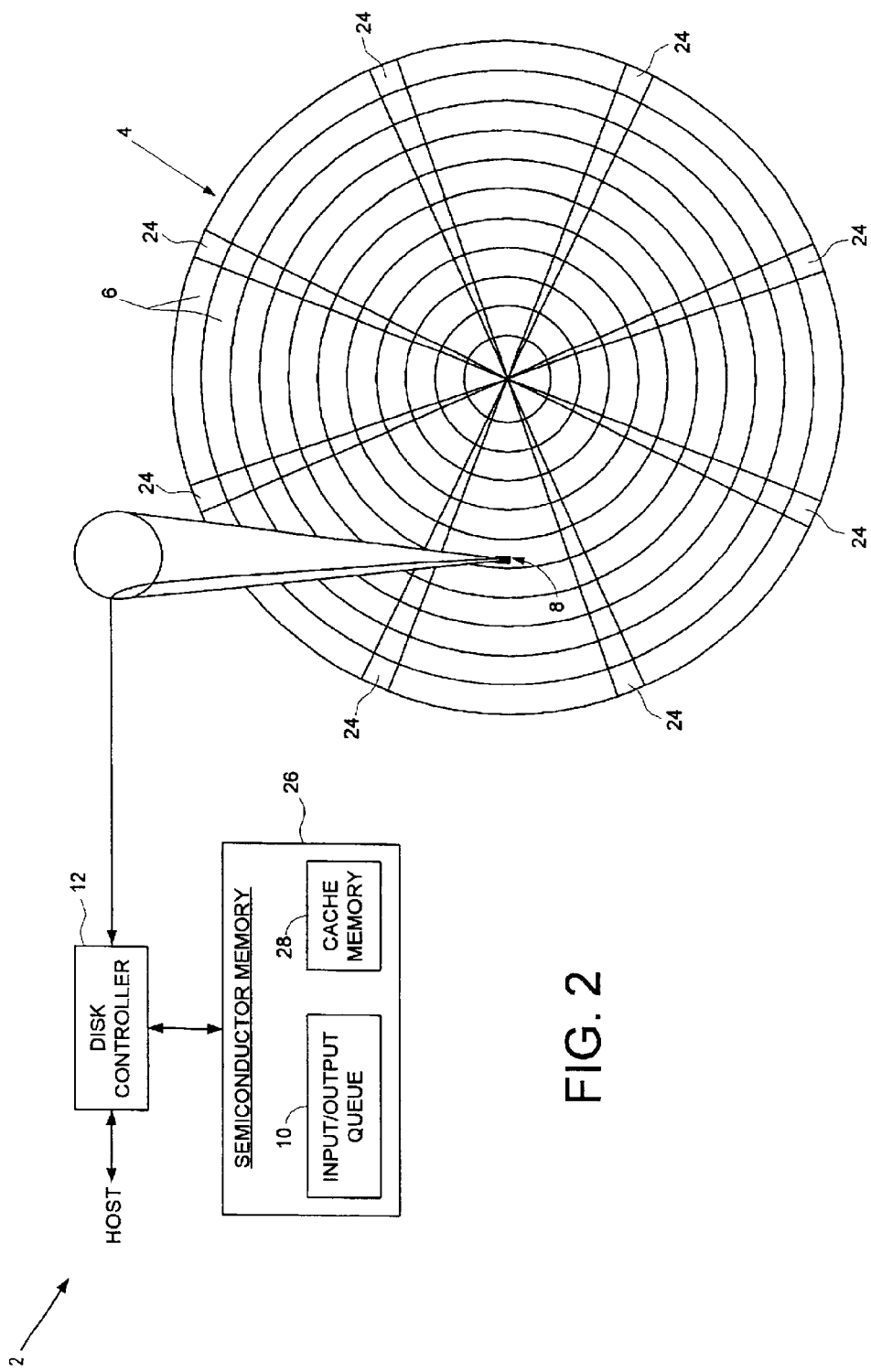
FIG. 2 shows a disk drive according to an embodiment of the present invention comprising a semiconductor memory comprising an I/O queue for storing read, write and write verify commands, and a cache memory for storing user data associated with the commands.

In an embodiment shown in FIG. 2, the disk drive 2 comprises a semiconductor memory 26 which may be volatile (e.g. DRAM) or non-volatile (e.g., FLASH). The semiconductor memory 26 stores the I/O queue 10 which may be implemented in any suitable manner, such as an array, a linked list of pointers, or multiple queues which collectively form the I/O queue. The semiconductor memory 26 is also used to implement a cache memory 28 for caching user data associated with the read and write commands received from the host. When the disk drive 2 receives a write command from the host, the user data to be written to the disk is cached in the cache memory 28 until the write command is successfully executed and verified. In one embodiment, if the amount of free memory in the cache memory 28 decreases to a predetermined limit, the memory allocated for a pending write verify command is de-allocated in order to free memory for subsequent commands. In one embodiment, the pending write verify command is deleted, and in another embodiment, the pending write verify command is still executed even though the memory storing the write data has been de-allocated.

Figure 3:
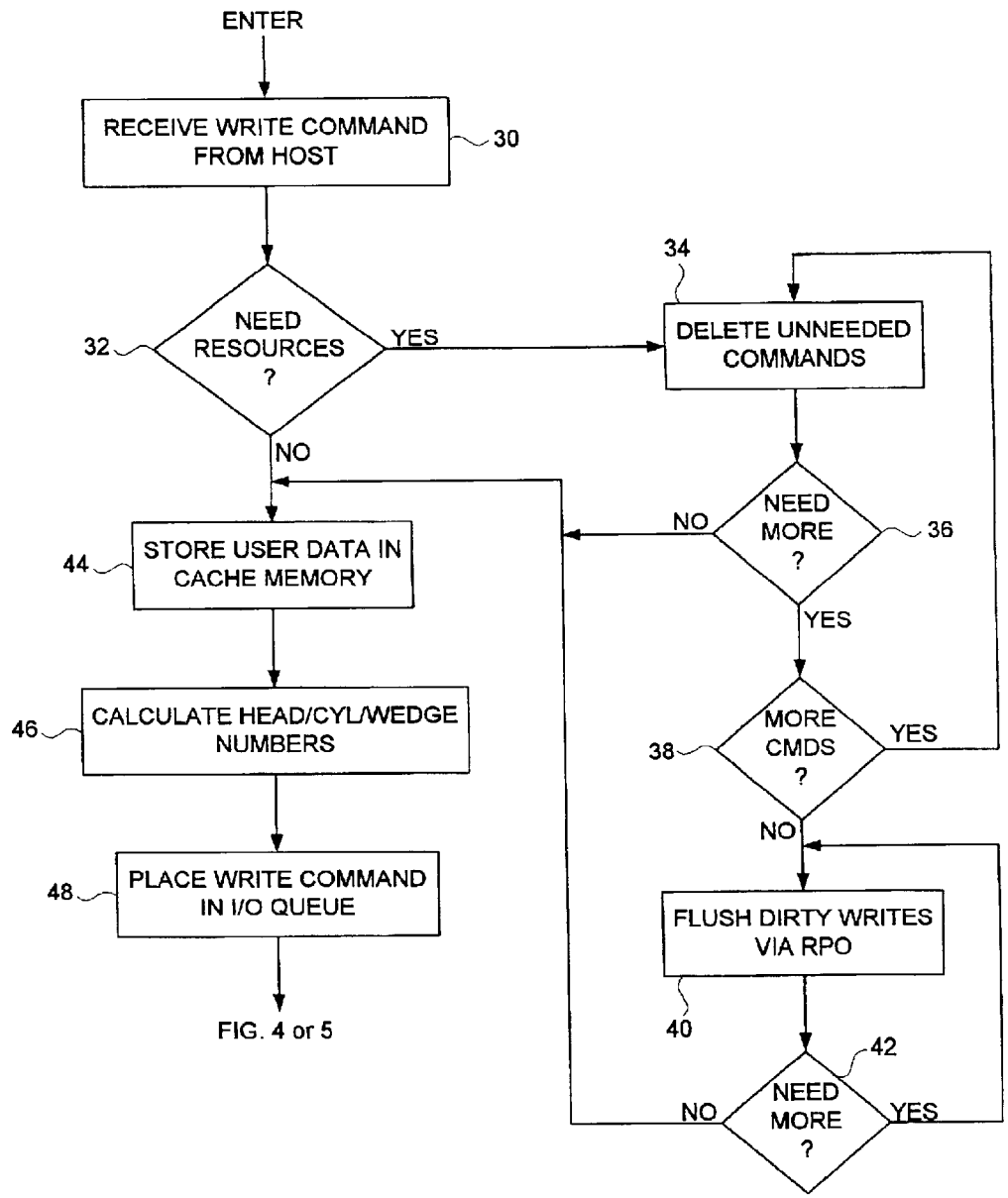
FIG. 3 is a flow chart according to an embodiment of the present invention illustrating how resources are freed to facilitate a recently received write command.

FIG. 3 shows a flow diagram executed by the disk controller 12 for processing a write command received from a host, including de-allocating memory for pending write verify commands if necessary. At step 30 the disk controller 12 receives a write command from the host and at step 32 the disk controller 12 determines whether there are sufficient resources (including cache memory 28) to service the write command. If resources are needed, then at step 34 the, disk controller 12 frees resources associated with unneeded commands, for example, by de-allocating cache memory 28 associated with the least recently requested read or write commands that have been successfully executed but which still have cached user data.

Figure 5:
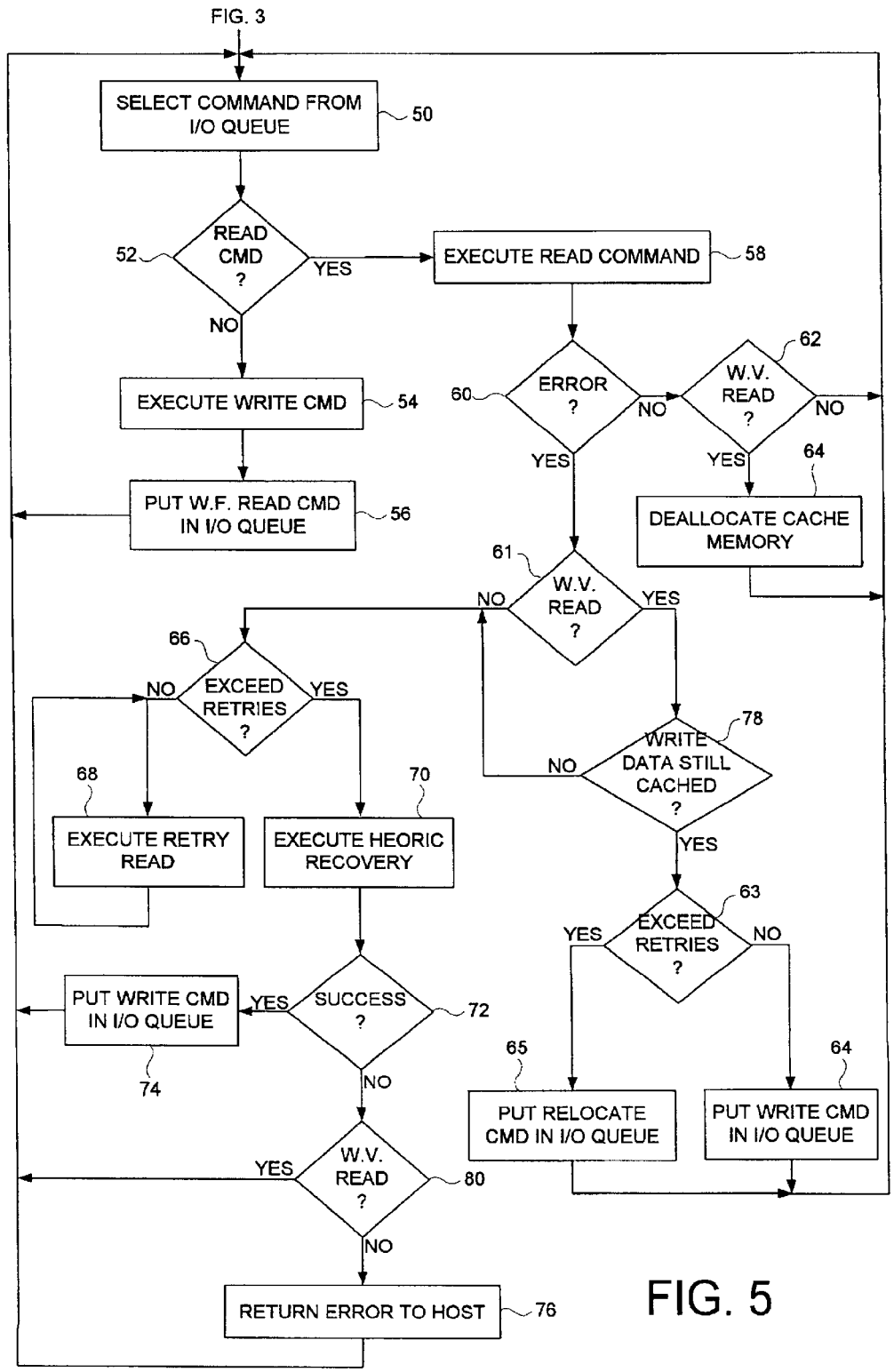
FIG. 5 is a flow chart according to an embodiment of the present invention illustrating how read, write, and write verify commands are executed according to the RPO algorithm wherein cache memory for pending write verify commands is de-allocated when resources are needed to process new commands without deleting the pending write verify commands from the I/O queue.

In one embodiment, at step 34 the disk controller 12 de-allocates cache memory 28 for one or more pending write verify commands to free memory for the write command received from the host at step 30. In one embodiment, the pending write verify commands are deleted from the I/O queue 10, and in an embodiment described below with reference to FIG. 5, the write verify commands are executed without the write data being cached. In one embodiment, the disk controller 12 uses a predetermined criteria to delete at least one of the write verify commands from the I/O queue 10. In one embodiment, the predetermined criteria deletes the write verify command that optimizes the RPO algorithm with respect to the remaining commands in the I/O queue 10. In another embodiment, each write command comprises data to be written to one or more data sectors and the predetermined criteria deletes the write verify command comprising the least number of data sectors to be verified compared to other write verify commands in the I/O queue 10.

If after deleting the unneeded commands at step 36 more resources are still needed and at step 38 there are no more unneeded commands that can be deleted, then at step 40 the disk controller 12 flushes dirty write commands according to the RPO algorithm. A dirty write command is a write command which is pending execution and therefore has user data stored in the cache memory. In effect, pending write commands are expedited at step 40 by assigning a higher priority in the RPO algorithm. The dirty writes are flushed at step 40 until sufficient resources are available at step 42 to process the new write command received from the host at step 30. At step 44 the user data associated with the new write command is stored in the cache memory 28, at step 46 the head/cylinder/wedge numbers are calculated for the new write command, and at step 48 the new write command is placed in the I/O queue 10 for processing according to the normal RPO algorithm.

Figure 4:
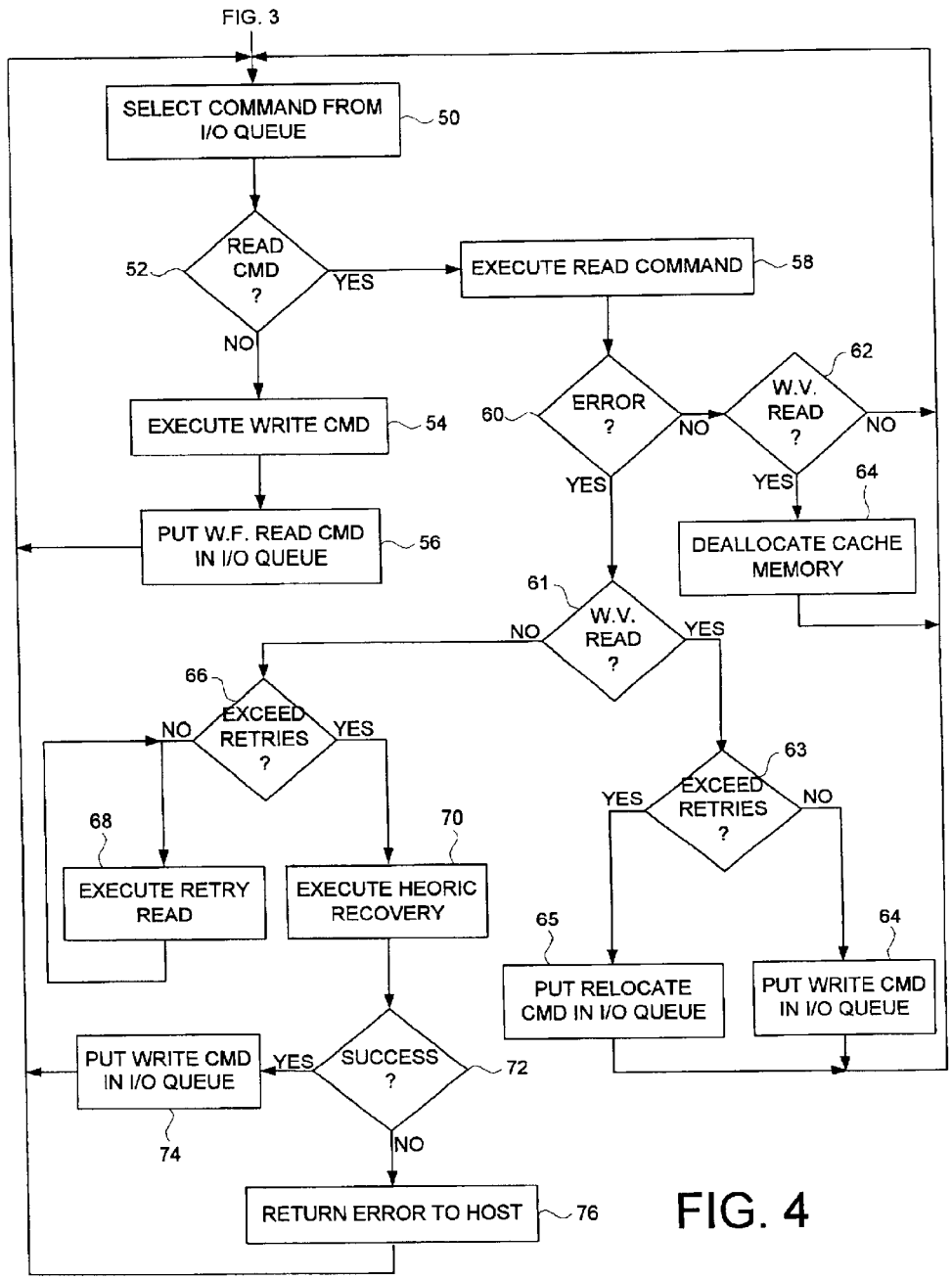
FIG. 4 is a flow chart according to an embodiment of the present invention illustrating how read, write, and write verify commands are executed according to the RPO algorithm wherein write verify commands are deleted from the I/O queue when resources are needed to process new commands.

Referring to the flow diagram of FIG. 4, at step 50 the disk controller 12 selects the next command to execute from the I/O queue 10 according to the RPO algorithm. If at step 52 the next command to execute is the write command received at step 30 (FIG. 2), then at step 54 the disk controller 12 executes the write command and inserts a corresponding write verify read command in the I/O queue at step 56. Control then branches back to step 50 to select the next command to execute from the I/O queue 10.

If at step 52 the next command to execute is a read command, then at step 58 the disk controller 12 executes the read command. If at step 60 the read is successful and at step 62 the read command was a write verify read command, then at step 64 the cache memory 28 storing the write data for the verified write command is de-allocated. If a read error occurs at step 60 (e.g., unable to recover a data sector using on-the-fly ECC) and at step 61 the read command was a write verify read command, then at step 63 a branch is executed based on the number of times the write verify command has been attempted. If the number has not exceeded a predetermined threshold, then at step 64 a write command is inserted into the I/O queue 10 so that the write command will be re-executed by again writing the write data to the target data sectors. The write command is re-executed according to the RPO algorithm when selected from the I/O queue at step 50.

If at step 63 a write verify command has failed a number times that exceeds the predetermined threshold, then at least one of the target data sectors responsible for the read error is relocated by inserting a relocate command into the I/O queue 10 at step 65. Relocating a data sector involves re-mapping a logical block address from the physical block address of an errant data sector to the physical block address of a spare data sector. The write data stored in the cache 28 is then written to the spare data sector. In order to optimize performance, the write command for writing the write data to the spare data sector is executed according to the RPO algorithm. In one embodiment) the data written to the spare data sector is verified and relocated yet again if necessary.

If at step 61 the read error occurred for a normal read command received from the host, then at step 66 a branch is executed according to a number of retry reads attempted on the errant data sector. If a number of retry reads has not exceeded a predetermined threshold, then at step 68 a retry read is attempted. If at step 66 the number of retry reads has exceeded the predetermined threshold, then at step 70 the disk controller 12 executes a number of heroic firmware error recovery procedures in an attempt to recover the errant data sector. The heroic firmware procedures may include adjusting various read channel parameters such as the equalizer filter coefficients, introduce an offset into the servo tracking algorithm, or adjusting other parameters which may enable successful recovery of the data sector. If the heroic firmware procedures are successful at step 72, then at step 74 a write command is inserted into the I/O queue 10 so that the errant data sector will be re-written and re-verified. If the heroic firmware procedures are not successful at step 72, then at step 76 an error is returned to the host computer indicating that the read operation failed.

Referring again to FIG. 3, in one embodiment at step 34 the cache memory 28 for selected write verify commands is de-allocated without actually deleting the write verify command from the I/O queue 10. The write verify command is still executed according to the RPO algorithm, and if the write verify fails, the heroic firmware procedures are executed in an attempt to recover data from an errant data sector. This embodiment is understood with reference to the flow diagram of FIG. 5. If at step 78 the write data is still cached after a write verify read has failed, then control proceeds to step 63 similar to FIG. 4. However, if the cache memory 28 for storing the write data was de-allocated at step 34 of FIG. 3, then control proceeds to step 66. If at step 72 the heroic firmware procedures are not successful in recovering the errant data sector, a branch is executed at step 80. If at step 80 the failed read operation was for a write verify command, then control proceeds at step 50 effectively ignoring the error since a new write command may over write the unrecoverable data sector. Otherwise, an error will be returned to the host at step 76 if a normal read operation attempts to read the errant data sector.

The disk controller 12 comprises suitable circuitry and/or software for processing the commands received from the host, such as processor circuitry, interface circuitry, an error correction code (ECC), a read/write channel, servo control, etc. The disk controller 12 may be implemented as a plurality of distinct integrated circuits, or as a single integrated circuit.

I claim:

1. A disk drive comprising:
   (a) a disk comprising a plurality of concentric tracks, each track comprising a plurality of data sectors;
   (b) a head actuated radially over the disk;
   (c) an input/output (I/O) queue for storing read and write commands received from a host computer; and
   (d) a disk controller for performing the commands stored in the I/O queue in an order determined from a rotational positioning optimization (RPO) algorithm, wherein the disk controller for:
      selecting a write command from the I/O queue according to the RPO algorithm;
      seeking the head to a target track and writing data to a target data sector;
      inserting a write verify command into the I/O queue;
      selecting the write verify command from the I/O queue according to the RPO algorithm and
      executing the write verify command to verify the recoverability of the data written to the target data sector.

2. The disk drive as recited in claim 1, further comprising a semiconductor memory comprising a plurality of blocks for storing write data received from the host computer and for storing read data read from the disk, wherein the block of semiconductor memory storing the write data for the target data sector is de-allocated after the disk controller executes the write verify command.

3. The disk drive as recited in claim 2, wherein the block of semiconductor memory storing the write data for the target data sector is de-allocated prior to the disk controller executing the write verify command if the amount of free blocks in the semiconductor memory is less than a predetermined threshold.

4. The disk drive as recited in claim 3, wherein:
   (a) the I/O queue stores a plurality of write verify commands corresponding to a plurality of written data sectors; and
   (b) when the number of free blocks in the semiconductor memory is less than the predetermined threshold, the disk controller uses a predetermined criteria to delete at least one of the write verify commands from the I/O queue and to de-allocate the corresponding block of semiconductor memory.

5. The disk drive as recited in claim 4, wherein the predetermined criteria deletes the write verify command that optimizes the RPO algorithm with respect to the remaining commands in the I/O queue.

6. The disk drive as recited in claim 5, wherein:
   (a) each write command comprises data to be written to one or more data sectors; and
   (b) the predetermined criteria deletes the write verify command comprising the least number of data sectors to be verified compared to other write verify commands in the I/O queue.

7. The disk drive as recited in claim 1, wherein the disk controller executes the write verify command by seeking the head to the target track and reading data from the target data sector.

8. The disk drive as recited in claim 7, wherein if the read fails the disk controller for:
   (a) selecting the write command from the I/O queue according to the RPO algorithm; and
   (b) executing the write command.

9. The disk drive as recited in claim 8, wherein if the write verify command fails multiple times, the disk controller for:
   (a) inserting a relocate command into the I/O queue, the relocate command for relocating an errant data sector;
   (b) selecting the relocate command from the I/O queue according to the RPO algorithm, and
   (c) executing the relocate command.

10. The disk drive as recited in claim 3, wherein the disk controller executes the write verify command by seeking the head to the target track and reading data from the target data sector.

11. The disk drive as recited in claim 10, wherein if the read fails and the write data associated with the write command has been de-allocated prior to the disk controller executing the write verify command, the disk controller for:
    (a) executing a firmware error-recovery procedure to recover the write data stored in the target data sector;
    (b) storing the recovered write data in the semiconductor memory; and
    (c) inserting a write command into the I/O queue for writing the write data to the target data sector.

12. A method of executing a write verify operation in a disk drive, the disk drive comprising a disk having a plurality of concentric tracks including a plurality of data sectors, a head actuated radially over the disk, and an input/output (I/O) queue for storing read and write commands received from a host computer, the method comprising the steps of:
    (a) selecting a write command from the I/O queue according to a rotational positioning optimization (RPO) algorithm;
    (b) seeking the head to a target track and writing data to a target data sector;
    (c) inserting a write verify command into the I/O queue;
    (d) selecting the write verify command from the I/O queue according to the RPO algorithm; and
    (e) executing the write verify command to verify the recoverability of the data written to the target data sector.

13. The method as recited in claim 12, further comprising the steps of:
    (a) storing write data received from the host computer in a semiconductor memory, and
    (b) de-allocating the block of semiconductor memory storing the write data for the target data sector after executing the write verify command.

14. The method as recited in claim 13, further comprising the step of de-allocating the block of semiconductor memory storing the write data for the target data sector before executing the write verify command if the amount of free blocks in the semiconductor memory is less than a predetermined threshold.

15. The method as recited in claim 14, further comprising the steps of:
    (a) storing in the I/O queue a plurality of write verify commands corresponding to a plurality of written data sectors; and
    (b) when the number of free blocks in the semiconductor memory is less than the predetermined threshold, using a predetermined criteria to delete at least one of the write verify commands from the I/O queue and to de-allocate the corresponding block of semiconductor memory.

16. The method as recited in claim 15, wherein the predetermined criteria deletes the write verify command that optimizes the RPO algorithm with respect to the remaining commands in the I/O queue.

17. The method as recited in claim 16, wherein:

(a) each write command comprises data to be written to one or more data sectors; and (b) the predetermined criteria deletes the write verify command comprising the least number of data sectors to be verified compared to other write verify commands in the I/O queue.

18. The method as recited in claim 12, wherein the step of executing the write verify command comprises the steps of seeking the head to the target track and reading data from the target data sector.

19. The method as recited in claim 18, wherein if the read fails, further comprising the steps of:

(a) selecting the write command from the I/O queue according to the RPO algorithm; and (b) executing the write command.

20. The method as recited in claim 19, wherein if the write verify command fails multiple times, further comprising the steps of:

(a) inserting a relocate command into the I/O queue, the relocate command for relocating an errant data sector;

(b) selecting the relocate command from the I/O queue according to the RPO algorithm; and (c) executing the relocate command.

21. The method as recited in claim 14, wherein the step of executing the write verify command comprises the steps of seeking the head to the target track and reading data from the target data sector.

22. The method as recited in claim 21, wherein if the read fails and the write data associated with the write command has been de-allocated prior to performing the write verify command, further comprising the steps of:

(a) executing a firmware error-recovery procedure to recover the write data stored in the target data sector;

(b) storing the recovered write data in the semiconductor memory; and (c) inserting a write command into the I/O queue for writing the write data to the target data sector.

* * * * *